April 28, 1925.
C. A. B. HALVORSON, JR
1,535,916
METAL MIRROR
Filed Feb. 28, 1924
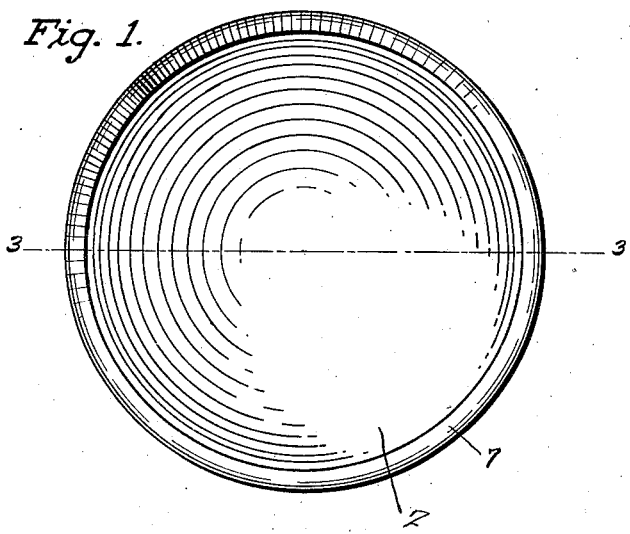
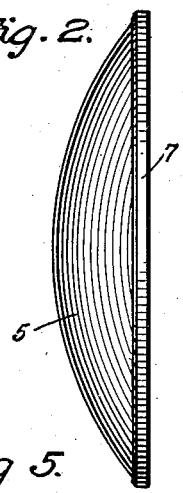
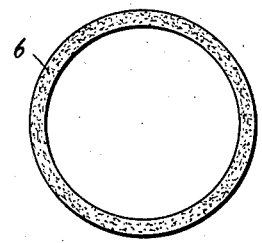
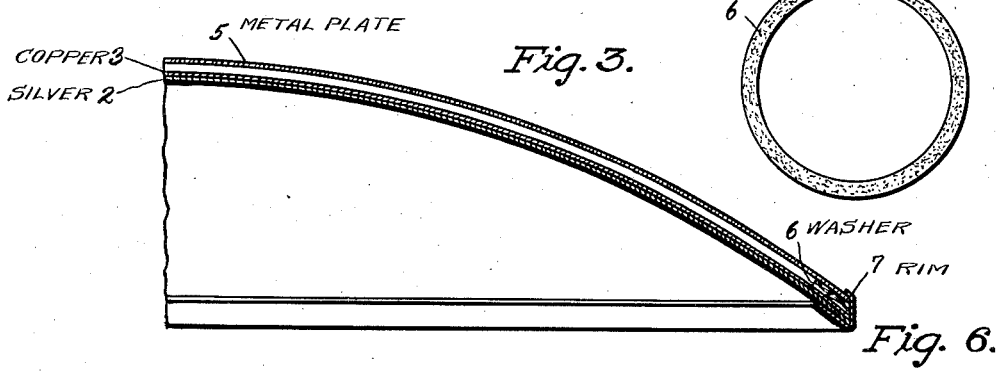
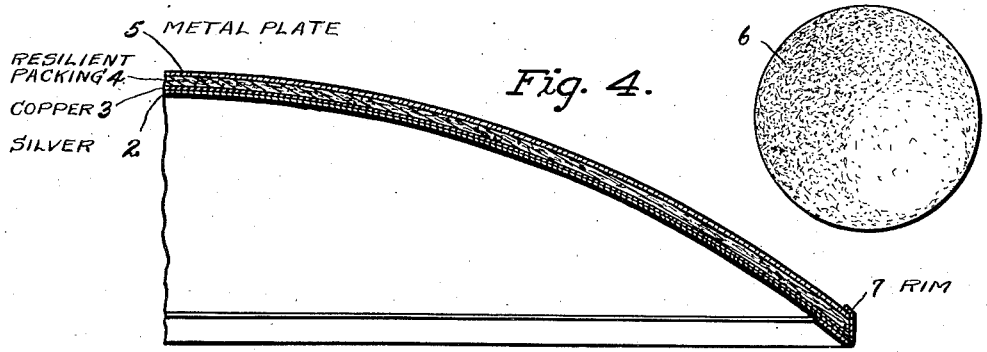
Inventor,
Cromwell A. B. Halvorson, Jr.,
by
His Attorney.

Patented Apr. 28, 1925.

1,535,916

UNITED STATES PATENT OFFICE.

CROMWELL A. B. HALVORSON, JR., OF LYNN, MASSACHUSETTS, ASSIGNOR TO GENERAL ELECTRIC COMPANY, A CORPORATION OF NEW YORK.

METAL MIRROR.

Application filed February 28, 1924. Serial No. 695,867.

*To all whom it may concern:*

Be it known that I, CROMWELL A. B. HALVORSON, Jr., a citizen of the United States, residing at Lynn, in the county of Essex, State of Massachusetts, have invented certain new and useful Improvements in Metal Mirrors, of which the following is a specification.

My invention relates to improvements in metal mirrors. In the case of the usual mirrors, the reflecting surface is protected by a glass to which it adheres. In such mirrors the rays of light must pass through glass before they strike the reflecting silver medium and the reflected rays must again pass through the glass before they issue into the field of illumination. In a mirror of this character, the glass is the cause of considerable loss of light. Furthermore, the glass is subject to breakage due to the heat generated by the source of light.

In mirrors of my construction, the light impinges directly upon a silvered surface inasmuch as the silvered surface is not located behind a glass or other transparent medium. Such an arrangement by eliminating the use of glass, avoids the objections above indicated.

In accordance with my invention, the reflecting surface is protected or reinforced by a layer of copper or other suitable metal. The mirror is further reinforced by backing the copper with a suitable resilient material, which in turn is backed by a suitable metallic surface. It has been proposed heretofore to use a cementitious materail. This cementitious material has been found to crack sometimes with the result that the reflecting surface is affected.

It is one of the objects of my invention to provide a special construction and to use in place of the cement a resilient material which avoids the objection above indicated with the result that a much more efficient, lasting and reliable mirror is produced. With the new form and method of construction, the mirror maintains its form and therefore maintains its focus in one position, the construction being sufficiently substantial and rigid to ensure against the shifting of the focal point.

To accomplish the foregoing and other useful ends, I make use of means hereinafter more fully set forth and claimed.

Referring to the accompanying drawing, Fig. 1 represents a mirror of my construction in front elevation; Fig. 2 is a side view of the mirror; Fig. 3 is a section along the line 3—3, Fig. 1, representing one type of construction in which the resilient material behind the copper is in the form of a ring; Fig. 4 is a section along the same line 3—3, Fig. 1, representing a different form of construction wherein the resilient material fills the entire space between the copper and the back reinforcing plate; Fig. 5 is a top view of the resilient washer employed in the type of construction indicated in Fig. 3, the washer in this figure being shown greatly reduced; and Fig. 6 is a top view of the resilient material in the form used in connection with the construction indicated in Fig. 4. This figure is also greatly reduced in size.

In the practice of my invention, I employ a pattern or matrix as in my United States Patent No. 1,394,085 the form of the surface of which matrix determines the shape of the mirror. This surface may be of any suitable or conventional form. It may be parabolic, hyperbolic or elliptical. I do not limit my invention to any particular form of surface. Generally, mirrors used as reflectors are parabolic and for purposes of illustration, I represent a parabolic form of mirror in the drawing.

As the first step in the manufacture of the mirror of my invention, the convex surface of the glass (if a concave form of mirror is desired) is thoroughly cleansed and is then silvered either by a chemical deposit or otherwise. In the practice of my invention I have found that while silver is the preferred reflecting surface, there are other metals which may be used. I have also found that if silver is used as the reflecting medium, it can be deposited chemically or it may be deposited by spraying on the glass supporting medium in a finely divided molten condition.

As indicated in the drawing, the reflecting silvered surface 2 comes first. After the surface has been laid down on the matrix, it is reinforced by a layer of copper 3 which may also be electrolytically deposited upon the silvered surface. If desired, a layer of silver may be applied to the chemically deposited layer by electrolytic process, thus providing two layers of silver. After the copper is deposited, it is shellacked and a layer of felt 4 is then applied. This layer may be of any suitable thickness, preferably from ⅛ to ¼ inch thick. The felt having been applied, the convex side of the felt is shellacked also and over this a metal reinforcement or backing in the form of a plate, such as the plate 5, is applied. As indicated in Fig. 3, instead of having the felt extend all over the copper backing as shown in Fig. 4, it may be in the form of a washer 6, Fig. 5. Whether the form shown in Fig. 6 or shown in Fig. 5 is used, the felt is shellacked so that it may adhere to the back plate 5.

The mirror is now ready for removal from the form. This may be accomplished in any suitable way as for example, by the use of compressed air around the edges between the silver and the matrix as described in my United States Patent No. 1,394,085. After the mirror is removed from the matrix, a metallic rim 7 is spun around the edge of the mirror as indicated in the various figures of the drawing. The metal that is used for this rim may be copper or aluminium or any other metal which can be readily spun.

While I have described my invention in a specific manner, it should be understood that I do not limit my invention thereto since various modifications will suggest themselves to those skilled in the art without departing from the spirit of my invention.

What I claim as new and desire to secure by Letters Patent of the United States, is:—

1. A mirror consisting of a metallic reflecting surface formed upon and lifted from a matrix, a reinforcing member of suitable material deposited upon the back of the reflecting surface, a metallic protecting cover secured to the back of the mirror with a resilient packing between the cover and the deposited metal.

2. A mirror consisting of a concave metallic reflecting surface formed upon and lifted from a matrix, said surface reinforced by a deposited convex layer of metal on the convex side of the mirror, a metallic concave protecting shell superimposed over the back of the mirror and a resilient packing between the shell and the deposited metal 3. A mirror having an exposed silver reflecting concave surface, said surface reinforced on its convex side only, the reinforcing means consisting of a layer of deposited metal, a layer of resilient material mounted on the said deposited metal surface and a metallic shell for the mirror conforming to the resilient surface, said shell clamped to the mirror with the said resilient layer in between the shell and the mirror.

In witness whereof, I have hereunto set my hand this 26th day of February, 1924.

CROMWELL A. B. HALVORSON, Jr.